April 9, 1963  P. B. ANDERSON  3,084,749
CULTIVATOR SHANK SPRING MOUNTING
Filed May 23, 1960

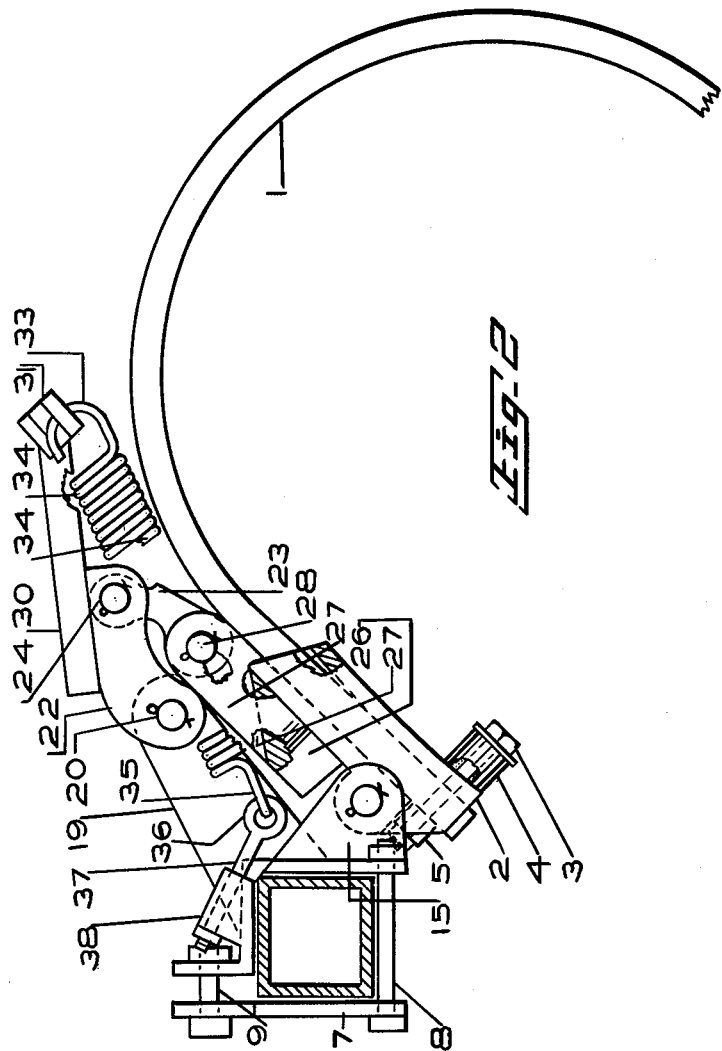

United States Patent Office 3,084,749
Patented Apr. 9, 1963

3,084,749
CULTIVATOR SHANK SPRING MOUNTING
Peter Britanius Anderson, Southey,
Saskatchewan, Canada
Filed May 23, 1960, Ser. No. 30,976
3 Claims. (Cl. 172—268)

This invention relates to a spring safety release for cultivator shanks, and is a continuation-in-part in respect to matter disclosed in a pending application filed September 9, 1957, under Serial Number 682,938, maturing to Patent No. 2,944,613, dated July 12, 1960, for Spring Release Mounting for Cultivator Shank, and for improvements thereon.

In the above entitled pending application there was disclosed a cultivating shank with holder and means suspending the holder from a cross beam of a cultivator. There was also provided a safety spring release for the shank and it is with this release and the clamp for mounting the attachment on the cultivator cross beam, and with improvements thereon, that the present application is concerned.

It has been found necessary to effect certain modifications in the device as previously disclosed to overcome difficulties encountered in field tests and in addition to adapt the spring release for use in a restricted area of the cultivator frame and still obtain the necessary clearance for movement of the shank. This involved considerable changes, including improvements in the clamp for attachment to the cultivator beam and the conversion of the spring release from a compression to a stretch spring arrangement.

More complete reference to these improvements will be found in the accompanying description taken in conjunction with the drawings wherein like characters of reference indicate like parts throughout the several views and wherein:

FIG. 1 is a side view of a cultivator shank and holder, and with this a spring release and clamp for attachment of the device on a cultivator cross beam in accordance with my improvements, shown with the shank as it would appear in working relation to the ground, and with the shank shown as broken away and the cultivator foot normally carried thereby omitted, and further showing the cross beam in section.

FIG. 2 is a side elevation corresponding to the showing in FIGURE 1, but with the shank elevated as would occur when avoiding an obstruction encountered by a shoe carried by the shank, shown with the holder and cushioning element for the holder broken away in part.

Figure 1:
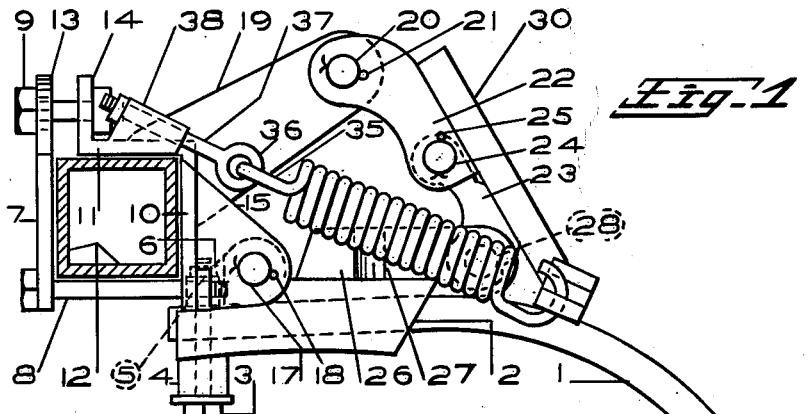
Figure 3:
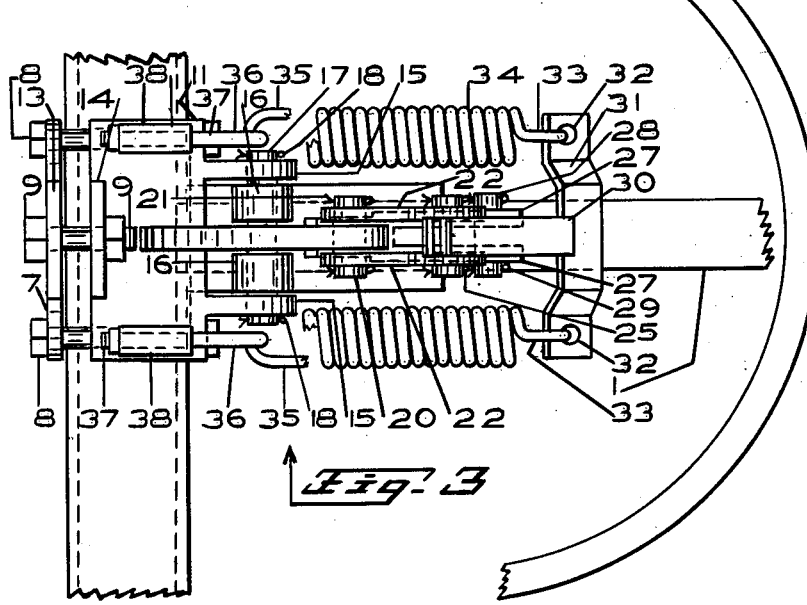
FIG. 3 is a top plan view of the device as shown in FIGURE 1, but with the cushioning element for the holder omitted for convenience of illustration and the springs broken away in part.

Having reference to the drawings there is shown a shank 1 carried in a holder 2 attached thereto by a bolt 3 through the holder and shank, this bolt having a cushioning element 4 on one end externally of the holder and a filler block 5 on the other end held by a nut 6, the holder having a suitable opening in which the block is set bearing against the shank 1, all of the above being as shown and described in the previous above mentioned application.

For the purpose of the present invention a new clamp for attachment on a cross beam of the cultivator was devised, partly to overcome structural weaknesses in the former clamp, and what was important to adapt it to the area restrictions imposed on the device when mounted in the cultivator frame and to give the shank the proper clearance.

This clamp comprises a front plate 7 to which attaches by lower bolts 8 and an upper bolt 9 a back plate consisting of a rearward plate section 10 parallel with the front plate, a top plate section 11 right angular to and integral with the rearward plate section, and upstanding lug portions 13 and 14 on the front plate 7 and top plate 11. The clamp so formed engages a cross beam 12 of the cultivator.

For mounting the holder 2 on the cross beam clamp the back plate 10 has spaced integral wings 15 extending rearward and between which upstanding lugs 16 on the holder 2 are mounted pivoted on a pin 17 that would be secured at the ends by cotter pins 18.

On the cross beam clamp back and top plates is an integral fin 19 that projects rearward and is inclined upward. This fin carries a pin 20 secured by cotter pins 21 and on which is pivoted a pair of link plates 22 between which plates is pivoted a link 23 on a pin 24 secured by cotter pins, as at 25.

On the holder 2 is fixed a block 26 with spaced rearwardly projecting arms 27 carrying a pin 28 secured by cotter pins 29, and on which pin the lower end of the link 23 pivots.

On the link plates 22 is fixed an arm 30 that carries at the rear end a cross bar 31 having openings 32 in which engage the hooked ends 33 of coiled springs 34.

The forward ends of springs 34 terminate in hooks 35 engaging eyes 36 of eye bolts 37 that engage lugs 38 formed integral upstanding on the top plate section 11 of the cross beam clamp.

In the operation of the device, when the shank 1 rises the holder 2 pivots on the pin 17 and carries the arms 27 upward and back, in which movement the link 23 pushes up on the link plates 22, which pivot on the pin 20 carried by the fin 19.

In the upward movement of the link plates 22 the bar 30 is carried upward stretching the springs 34, which on release of the shank after clearing an obstruction pull down on the bar 30 moving the links 22 down and the link 23 rearward, restoring the shank to its normal lowered working position.

In the above arrangement a high overpass clearance for the shank is provided for, this being necessary when a particularly large obstruction is encountered, and during such extreme clearance the spring pressure on the shanks drops to almost nothing, the leverage power exerted by the shank through the link 23 increasing. Conversely a cultivating shoe on the shank will penetrate back into the ground after the obstruction has been cleared and deep cultivating is at once renewed, the spring arrangement producing severe penetration and ground fighting by the cultivating elements.

The springs 34 are adjustable by the eye bolts to vary the tension and the consequent pressure exerted by them in opposing upward movement of the shank and in driving the shank down.

The use of pull springs instead of compression has resulted in a more compact unit without loss of efficiency, and spring alignment and fatigue are no longer problems.

Having thus described and ascertained the nature of my said invention, what I claim and wish to secure by Letters Patent is:

1. In a spring release for mounting a cultivator shank on a frame cross bar including a clamp attachable on the cross bar, said clamp having an upwardly projecting fin, wings rearwardly projecting from the clamp, the shank having means by which it may be pivotally carried by the wings, said shank carrying means including a rearwardly projecting arm having a link pivoted thereto, link plates having their upper ends pivoted to the fin and their lower ends pivoted to the link, an arm fixed on the link plates projecting over said link, coiled springs attached to the clamp, and means attaching said springs to the outer end of the arm on the link plates tensionable by upward movement of the shank.

2. In a spring release mounting for a cultivator shank including a clamp for attachment on a frame cross bar of a cultivator, said clamp having a rearwardly projecting fin, and said mounting including means pivotally attaching the shank to the clamp below the fin and a link pivotally carried by said shank attaching means, link plates pivotally connected to the fin and to the link on the shank, an arm carried by the link plates rearwardly extending overlying the link on the shank and opposing inward pivotal movement of the link and link plates, coiled springs attached anchored to said clamp, and means attaching said springs to the outer end of said arm tensionable by upward movement of the shank.

3. In a spring release for mounting a cultivator shank on a frame cross bar including a clamp attachable on the cross bar and a rearwardly projecting fin on the clamp, and including means pivotally mounting the shank on the clamp and an assembly of pivotally connected link plates and a link respectively pivotally attached to the fin and shank, an arm attached to the link plates projecting outward over the link, springs anchored to the shank, and means attaching the springs to the outer end of the arm tensionable by upward movement of the shank.

References Cited in the file of this patent

UNITED STATES PATENTS

| | | |
|---|---|---|
| 839,956 | Reeves et al. | Jan. 1, 1907 |
| 2,627,798 | Graham | Feb. 10, 1953 |
| 2,690,111 | Altgelt | Sept. 28, 1954 |
| 2,701,994 | Jennings | Feb. 15, 1955 |
| 2,906,353 | Rogers | Sept. 29, 1959 |
| 2,935,144 | Graham | May 3, 1960 |
| 2,944,613 | Anderson | July 12, 1960 |

FOREIGN PATENTS

| | | |
|---|---|---|
| 867,469 | Germany | Feb. 19, 1953 |
| 6,356 | Great Britain | Mar. 21, 1908 |